(12) United States Patent
Murdoch et al.

(10) Patent No.: US 9,350,577 B2
(45) Date of Patent: May 24, 2016

(54) COMMUNICATION METHOD AND DEVICE

(75) Inventors: Graham Alexander Munro Murdoch, Wollstonecraft (AU); Stuart Colin Littlechild, Haberfield (AU)

(73) Assignee: SATO HOLDINGS CORPORATION, Tokyo (JP)

( * ) Notice: Subject to any disclaimer, the term of this patent is extended or adjusted under 35 U.S.C. 154(b) by 885 days.

(21) Appl. No.: 12/448,866

(22) PCT Filed: Jan. 21, 2008

(86) PCT No.: PCT/AU2008/000068
§ 371 (c)(1),
(2), (4) Date: Aug. 17, 2009

(87) PCT Pub. No.: WO2008/089507
PCT Pub. Date: Jul. 31, 2008

(65) Prior Publication Data
US 2010/0002803 A1    Jan. 7, 2010

(30) Foreign Application Priority Data
Jan. 22, 2007  (AU) ................................. 2007900290

(51) Int. Cl.
| H03K 7/04 | (2006.01) |
| H03K 7/06 | (2006.01) |
| H03K 9/04 | (2006.01) |
| H03K 9/06 | (2006.01) |
| H04L 25/49 | (2006.01) |

(52) U.S. Cl.
CPC .................................. *H04L 25/4902* (2013.01)

(58) Field of Classification Search
None
See application file for complete search history.

(56) References Cited

U.S. PATENT DOCUMENTS

| 4,007,421 | A | * | 2/1977 | Lien ............................... 375/254 |
| 5,488,628 | A | * | 1/1996 | Thoulon ....................... 375/239 |
| 6,005,638 | A | | 12/1999 | Blair et al. |
| 6,034,603 | A | | 3/2000 | Steeves |
| 6,061,475 | A | | 5/2000 | Blair |
| 6,294,953 | B1 | | 9/2001 | Steeves |
| 6,570,487 | B1 | | 5/2003 | Steeves |
| 6,954,859 | B1 | | 10/2005 | Simerly et al. |
| 7,005,985 | B1 | | 2/2006 | Steeves |
| 7,271,727 | B2 | | 9/2007 | Steeves |
| 7,286,158 | B1 | | 10/2007 | Griebenow |
| 2003/0142742 | A1 | | 7/2003 | Hartmann |
| 2006/0066444 | A1 | | 3/2006 | Steeves |
| 2006/0071756 | A1 | | 4/2006 | Steeves |
| 2007/0159338 | A1 | | 7/2007 | Beber et al. |
| 2007/0205896 | A1 | | 9/2007 | Beber et al. |
| 2007/0285241 | A1 | | 12/2007 | Griebenow et al. |
| 2008/0042850 | A1 | | 2/2008 | De Witte et al. |
| 2008/0043871 | A1 | * | 2/2008 | Latouche ............... H04L 27/186 375/261 |
| 2008/0291063 | A1 | * | 11/2008 | Hollis ............................. 341/55 |
| 2009/0296853 | A1 | * | 12/2009 | Doong ................ H04L 27/2007 375/296 |

FOREIGN PATENT DOCUMENTS

WO    WO-99/34526    7/1999

* cited by examiner

*Primary Examiner* — Shuwang Liu
*Assistant Examiner* — Gina McKie
(74) *Attorney, Agent, or Firm* — Sughrue Mion, PLLC

(57) ABSTRACT

The present invention relates to the field of communication and transmission of signals. In particular, the present invention relates to a new communication and/or modulation method. The present invention also relates to improving channel occupancy. The present specification discloses the adoption of phase transitions/changes in a manner that indicates a code by virtue of their position (timing) in the communication. This is referred to as Phase Position Modulation.

20 Claims, 14 Drawing Sheets 6.78 MHz and 13.56 MHz magnetic field strength limit at 10 metres measurement distance Fig 2
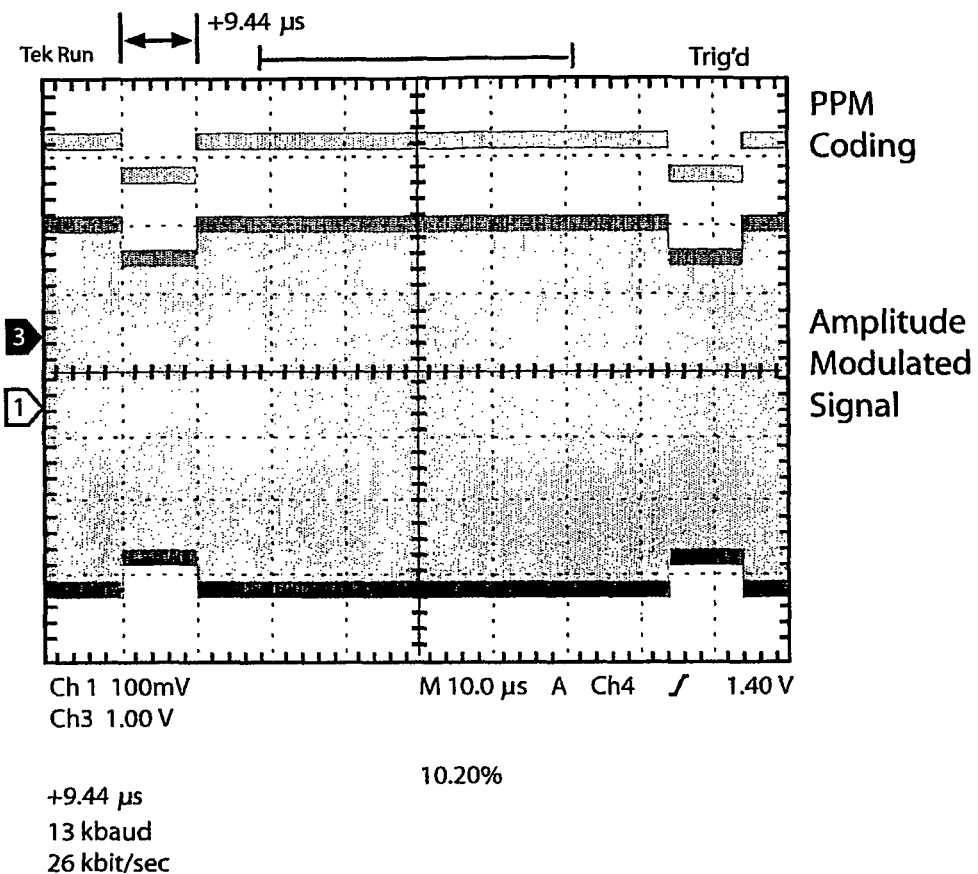
+9.44 μs
13 kbaud
26 kbit/sec
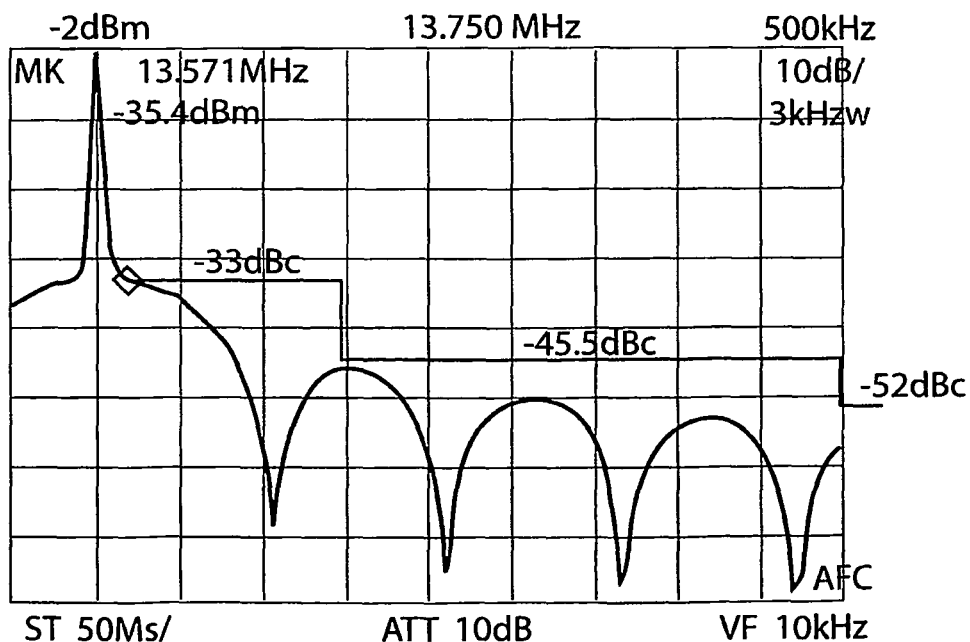

MODE 2 READ COMMAND (DETAIL) (1 degree phase modulation)

Example of 1 out of 4 Coding

Time position of Phase Transition

| Baud | 1 | 2 | 3 | 4 |
|------|---|---|---|---|
| 00   | + |   |   |   |
| 01   |   | X |   |   |
| 10   |   |   | X |   |
| 11   |   |   |   | X |

X = Phase Change
+ = Phase Change suppressed only for first '00' with one or more '00'

Time for Phase Changes/Transitions

* First phase change suppressed for one or more '00'

1 out of 4 Phase Position Modulation (PHPM) for '011100100000'

Example of 1 or 2 out of 16 PHPM

Time position of Phase Transition

| Baud | 1 | 2 | 3 | 4 | 5 | 6 | 7 | 8 |
|------|---|---|---|---|---|---|---|---|
| 0000 | + |   |   |   |   |   |   |   |
| 0001 |   | X |   |   |   |   |   |   |
| 0010 |   |   | X |   |   |   |   |   |
| 0011 |   |   |   | X |   |   |   |   |
| 0100 |   |   |   |   | X |   |   |   |
| 0101 |   |   |   |   |   | X |   |   |
| 0110 |   |   |   |   |   |   | X |   |
| 0111 |   |   |   |   |   |   |   | X |
| 1000 |   | X |   |   | X |   |   |   |
| 1001 |   | X |   |   |   | X |   |   |
| 1010 |   | X |   |   |   |   | X |   |
| 1011 |   | X |   |   |   |   |   | X |
| 1100 |   |   | X |   | X |   |   |   |
| 1101 |   |   | X |   |   | X |   |   |
| 1110 |   |   | X |   |   |   | X |   |
| 1111 |   |   | X |   |   |   |   | X |

X = Phase Change
+ = Phase Change suppressed only for first '0000' with one or more '0000'

Spectrum for 1 out of 4 with the first '00' suppressed

Spectrum for 1 or 2 out of 16 with the first '0000' suppressed

COMMUNICATION METHOD AND DEVICE

FIELD OF INVENTION

The present invention relates to the field of communication and transmission of signals. In particular, the present invention relates to a new communication and/or modulation method. The present invention also relates to improving channel occupancy.

In one form, the invention relates to RF signal transmission, for example, a RF signal transmission adapted for use in an RFID (Radio Frequency Identification) system.

In another form, the present invention has particular application to Phase Jitter Modulation signal communication, such as that disclosed in PCT/AU98/01077 (WO 99/34526) entitled 'A transmitter and a method for transmitting data'. The present invention also has application to other types of signal transmissions.

It will be convenient to hereinafter describe the invention in relation to RF signal transmission, however it should be appreciated that the present invention is not limited to that use only.

BACKGROUND ART

The discussion throughout this specification comes about due to the realisation of the inventors and/or the identification of certain prior art problems by the inventors.

In recent years limits have been imposed on the strength of signal transmissions in RFID systems for various reasons. However, such a reduction in signal strength has also brought with it increased problems with the reliability of signal transmission. Because the signal strength is reduced due to regulations imposed in various countries, the signals transmitted are increasingly susceptible to noise and other external factors and become increasing difficult to receive and decode, any one of which can interfere with reliable signal transmission.

FIG. 1 illustrates a 'spectral mask' being the spectrum field strength limits as defined by CEPT/cal recommendation 70-03[3]; Draft ETSI EN300 330-1 V1.4.1 (2004-11). The spectral mask shown results in 99%, or more, of the signal power being in the central carrier and 1%, or less, of the signal power being in the modulated sidebands. This type of signal is quite unique as normally the power in the modulated sideband (which conveys the data) is as large as possible and the power in the central carrier is a small as possible and ideally is zero as it conveys no data.

FIG. 2 illustrates a representation of a signal according to ISO 15693 standard which meets the spectral limits of FIG. 1. However, this transmission is at 26 Kbit/s, 13K Baud and is thus considered to have a relatively slow bit rate and relatively slow baud rate. Accordingly, this transmission standard is not considered suitable for a number of applications, such as RFID application in which high speed RF signal transmissions are required.

FIG. 3 illustrates a method of transmission as used by the current applicant in conjunction with their Phase Jitter Modulation (PJM) transmission technique as disclosed in WO1999034526, the disclosure of which is incorporated herein by reference. This transmission mode ulitises 1 degree of phase modulation, at 424 Kbit/sec, and has been found to be very effective in RFID applications. However, it would be desirable to take advantage of the spectral mask limits and have more of the signal as illustrated in FIG. 3 within the region marked A, i.e. between the levels of −33 dB and −45.5 dB. The result allow a boost in modulation signal strength of substantially 12.5 dB (approximately 1 degree to 3 degrees), but still be substantially within the spectral mask limits as illustrated in FIG. 1.

FIG. 4 illustrates an alternative method of transmission to the PJM transmission of FIG. 3. This alternative method utilizes 3 degrees phase modulation which enhances transmission reliability because the received signal is substantially three times stronger and hence the signal to noise ratio is much better than a signal having one degree phase modulation. It can be seen that this alternative transmission has a relatively increased portion of the signal within the region A of the spectral mask (as compared to FIG. 3), and in this regard, this alternative transmission has a boosted signal strength as compared to the transmission illustrated in FIG. 3. However, the alternative transmission operates at only half the data rate of the transmission of FIG. 3, i.e. at a data rate of 212 kbit/sec. It is considered desirable to have an improved bit rate.

FIG. 5 illustrates a relatively conventional MFM method of transmission, at 424 kbit/sec and as applied to the spectral mask of FIG. 1. By way of explanation, MFM or modified frequency modulation transmission improves on FM (Frequency modulation) by reducing the number of phase reversals inserted just for the clock. Instead of inserting a clock reversal at the start of every bit, one is inserted only between consecutive zeros. When a 1 is involved there is already a reversal (in the middle of the bit) so additional clocking reversals are not needed. When a zero is preceded by a 1, it is similarly known that there was recently a reversal and another is not needed. Only long strings of zeros have to be "broken up" by adding clocking reversals. FIG. 6 provides an illustration of MFM method of transmission, where FM and MFM encoding write waveform for the byte "10001111". It can be seen that MFM encodes the same data with substantially half as many edges per bit of data. In FIG. 5 it can be seen that a portion of the signal is desirably within the region marked A (compared to FIG. 3 which has little signal in region A, and FIG. 4 which has a comparatively slow data rate). However, the transmission of MFM is considered susceptible to noise and other external factors and impact on the reliability of the signal transmission. It would be desirable to have a relatively more reliable method of signal transmission.

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure and claims herein.

An object of the present invention is to provide a transmission method and/or associated device which enables signal transmission at relatively high data rates and within a prescribed spectral mask, for example the spectral mask of FIG. 1.

A further object of the present invention is to alleviate at least one disadvantage associated with the prior art.

SUMMARY OF INVENTION

The present invention provides, in accordance with one aspect of invention, a method of and/or apparatus for modulating a signal, comprising determining a predefined time period during which a portion of the signal may be encoded, the time period having a plurality of time intervals, encoding the signal in association with at least one time interval, and the encoding comprising an amplitude or phase change The present invention also provides, in accordance with a second aspect of invention, a method of and/or apparatus for encoding data and/or a signal, comprising encoding the data and/or signal in accordance with a change of amplitude or phase relative to a time interval and/or position of the signal.

The present invention also provides, in accordance with a third aspect of invention, a method of and/or apparatus for converting data and/or a signal from a first format to a second format, comprising converting the data and/or signal in accordance with a change of amplitude or phase relative to a time interval and/or position of the signal. Preferably, the conversion comprises encoding and/or decoding.

The present invention also provides, in accordance with a fourth aspect of invention, a method of and/or apparatus for demodulating a signal, comprising receiving the signal, determining a predefined time period during which a portion of the signal may be transmitted, the time period having a plurality of time intervals, and decoding the signal in association with at least one time interval, the decoding comprising detection of an amplitude or phase change.

The present invention also provides, in accordance with a fifth aspect of invention, a method of and/or apparatus for decoding data and/or a signal, comprising decoding the data and/or signal in accordance with a change of amplitude or phase relative to a time interval and/or position of the signal.

The present invention also provides, in accordance with a sixth aspect of invention, a method of and/or apparatus for transmitting a signal, comprising encoding a signal as disclosed herein and transmitting the encoded signal.

Preferably, the power in the encoded amplitude or phase change signal is less than 1% of the total transmitted signal power.

The present invention also provides, in accordance with a seventh aspect of invention, a method of and/or apparatus for performing operation(s) on data and/or a signal, said apparatus including processor means adapted to operate in accordance with a predetermined instruction set, said apparatus, in conjunction with said instruction set, being adapted to perform a method as disclosed herein.

The present invention provides, in accordance with an eighth aspect of invention, RFID and/or passive powering in conjunction with PHPM or AMPM as disclosed herein.

Other aspects and preferred aspects are disclosed in the specification and/or defined in the appended claims, forming a part of the description of the invention.

In essence, the present invention comes about due to the realisation that amplitude and/or phase transition(s)/change(s) may be ultilised as a means of communication (including encoding, decoding and transmission) in a similar manner as pulses are used in a PPM method of communication. The amplitude or phase transitions/changes may indicate a code by virtue of their position (timing) in the communication. The use of amplitude or phase transitions/changes to indicate a code by virtue of their position (timing) for communication is herein referred to as Phase Position Modulation (PHPM) in the case of phase transition and Amplitude Position Modulation (AMPM) in the case of amplitude transition. These amplitude and/or phase transitions/changes may further be communicated, in one embodiment, in association with PJM as disclosed in WO1999034526. In effect, at a relatively general level, the present invention may be seen as using the 'timing principle of PPM' but applied to PJM.

In this document where a phase change or PHPM is referred to then an amplitude change or AMPM is also implied. Typically for both PHPM and AMPM the power present in the encoded phase or amplitude change is less than 1% of the transmitted signal power. More than 99% of the transmitted signal power is in the unmodulated central carrier. This is uniquely different from traditional communication methods where the carrier power is considered wasted as it conveys no information. For the applications relevant to this invention the carrier power is an essential part of the signal as it is required to both power the receiving device and act as a carrier of the encoded modulation component of the signal.

For PHPM the average spacing between phase transitions is at the baud rate unlike PPM where the spacing between amplitude transitions/changes is governed by the pulse width which is typically 10% of the baud rate. Accordingly compared to a PPM signal the spectrum of a PHPM signal is narrower and has lower high frequency content. PHPM has half the number of phase transitions compared to PPM amplitude transitions. Accordingly a PHPM signal will have half the spectral energy of an equivalent PPM signal. This allows the PHPM modulation level to be increased improving the detection reliability of a receiver.

AMPM and PHPM represent the in-phase or quadrature component of the same signal. Whether the encoding is transmitted as a relatively small amplitude or phase change makes little, if any, difference to the spectral amplitude or shape. The choice of amplitude or phase affects the type of detection circuitry used in the tag/receiver/chip. Also the choice of amplitude or phase may be dependent upon the operating frequency. UHF is preferably amplitude, and HF may be either phase or amplitude but phase modulation may be easier to implement at HF.

Further improvements related to spectral occupancy and communication reliability are also provided in accordance with aspects of the present invention. Where PHPM encoding requires two transitions to be relatively close together the second transition may be suppressed and the correct data inferred from the absence of a transition. This ensures that there is always a relatively wide separation between transitions to minimise the high frequency spectrum content.

In the case of RFID or passive powering, for example, and the methods of encoding and modulation as disclosed herein are utilised to obtain PHPM or AMPM, there are significant advantages that are not considered possible with PJM using the widely known MFM encoding or PPM for amplitude modulation. Further the advantages of PHPM and AMPM are not obvious as they are a result of the combination of modulation and the encoding and could not be predicted from each alone. The present invention has been found to result in a number of advantages, such as:

Greatly reduced spectral occupancy
  Reduced high frequency spectral content
  Increased PJM levels with improved Signal to Noise
  Allows for a PHPM receiver design that is more tolerant to production variations
  Smaller chip area required for PHPM receiver circuits
  Lower current required for PHPM receiver circuits
  Improved signal reliability
  With PHPM/AMPM there is only one change/transition per symbol compared to two changes per symbol with PPM. Hence the amplitude of spectral content has been found to be significantly lower with PHPM/AMPM compared to PPM.
  The spacing between changes/transitions for PHPM/AMPM are at least at the baud rate where as with MFM they are at the bit rate or with PPM they are a small fraction of the baud rate. Hence the PHPM/AMPM spectrum is much narrower and has a completely different form compared to MFM or PPM.
  There is substantially no reduction in timing resolution required to detect PHPM/AMPM compared to the equivalent MFM encoding. This is a surprising result as fewer modulation changes are being used to transmit the same amount of data.

By moving from MFM to PHPM or AMPM, the modulation level can be increased more than 3 times for the same data rate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further disclosure, objects, advantages and aspects of the present application may be better understood by those skilled in the relevant art by reference to the following description of preferred embodiments taken in conjunction with the accompanying drawings, which are given by way of illustration only, and thus are not limitative of the present invention, and in which:

FIG. 2 illustrates a representation of a signal according to ISO 15693 standard which meets the spectral limits of FIG. 1;

DETAILED DESCRIPTION

Figure 7:
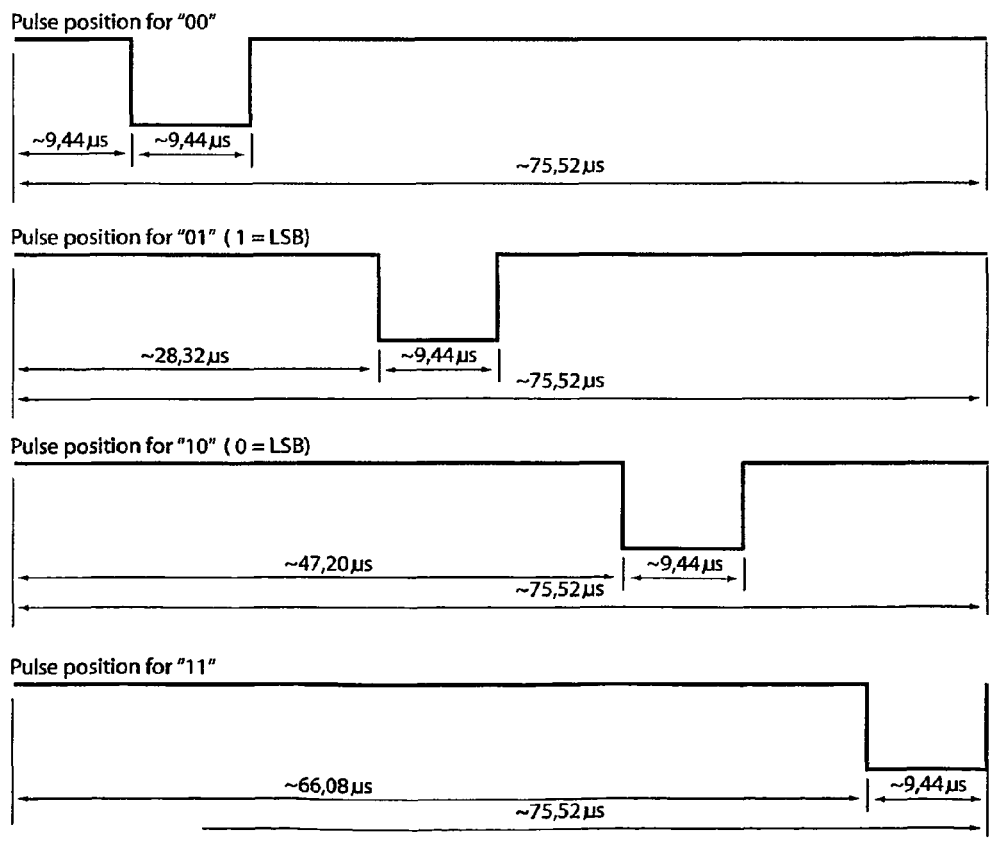
FIG. 7 illustrates 1 out of 4 pulse position modulation (PPM)
Figure 8:
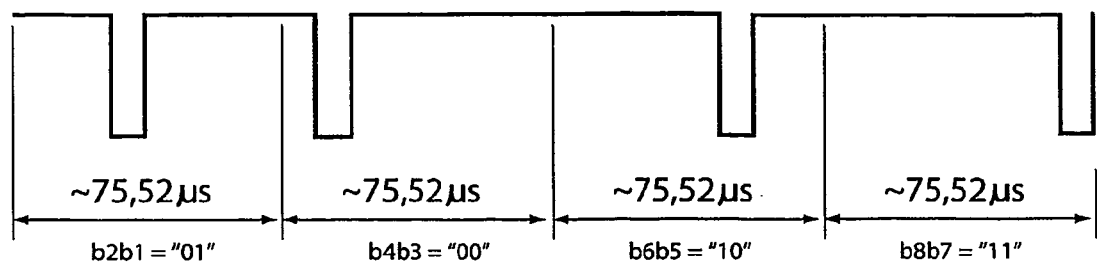
FIG. 8 illustrates an example of 1 out of 4 PPM.

FIG. 7 illustrates 1 out of 4 pulse position modulation (PPM). The coding effected by pulse position modulation for 1 out of 4 mode is shown according to the standard ISO/IEC 18000-3:2004(E). It can be seen that the position of the transmitted pulse (relative to time) indicates whether the received signal will be interpreted as a '00', '01', '10', or '11'. FIG. 8 illustrates an example of 1 out of 4 PPM as applied to the binary 01001011.

It is well understood that when the bit pairs '00', '01', '10' and '11' are represented by modulation symbols these modulation symbols are called bauds. A baud is a modulation symbol that can represent one bit or multiple bits depending upon the method of encoding used. For example in 1 out of 4 PPM each baud (pulse) represents 2 bits.

Figure 9:
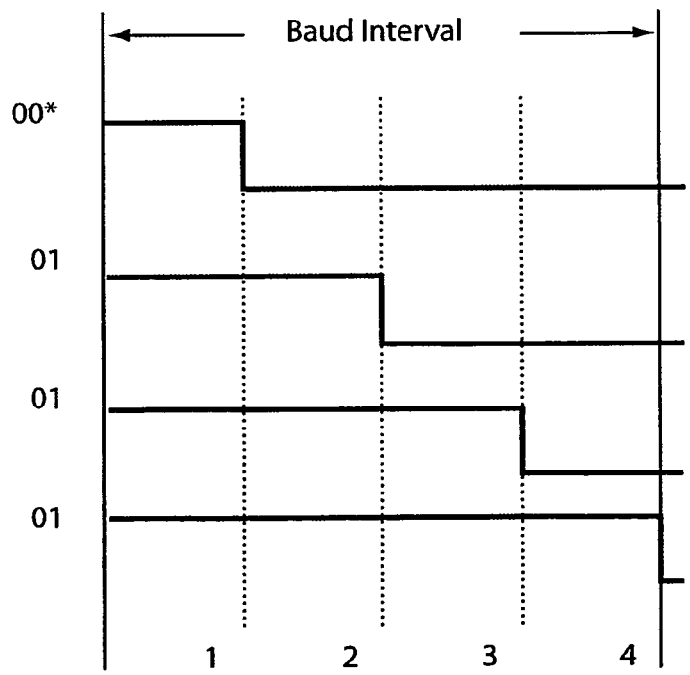
FIG. 9 illustrates 1 out of 4 Phase Position Modulation (PHPM)

FIG. 9 illustrates an example of 1 out of 4 Phase Position Modulation (PHPM). Advantageously, the present invention ultilises a change of phase (relative to a time/position) to indicate a particular coding. This may be referred to as PHPM (Phase Position modulation). In a manner somewhat akin to PPM which uses an amplitude pulse in a certain position relative to time (for example 1 out of 4 coding) to indicate '00', '01' etc, the PHPM of the present invention uses a phase change in a certain position relative to time to indicate '00', '01', '10', or '11'. The phase change for a single '00' is preferably suppressed however for a sequence of two or more '00's, or two or more of the same data, preferably the phase change for the first '00' or data is suppressed. Preferably each PHPM baud represents 2 bits.

Figures 10, 11:
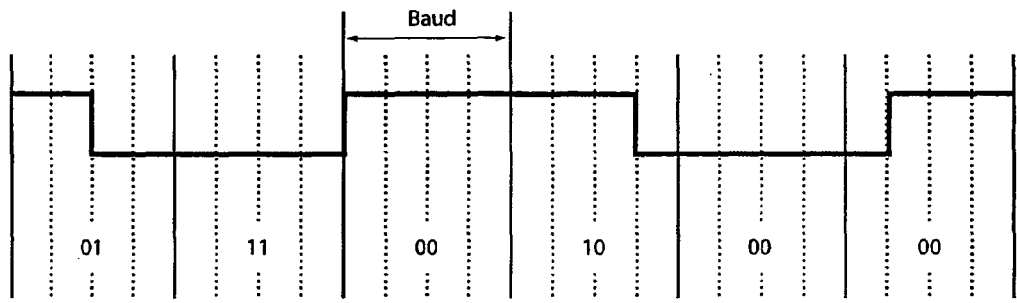
FIG. 10 illustrates an example of 1 out of 4 PHPM (Phase position modulation)
FIG. 11 illustrates 1 or 2 out of 16 PHPM (Phase position modulation) according to the present invention.

FIG. 10 illustrates an example of 1 out of 4 PHPM (Phase position modulation). The phase change for a single '00' is preferably always suppressed and preferably for a sequence of two or more '00's only the phase change for the first '00' is suppressed. After the '11' the suppression of the '00' phase transition prevents two relatively closely spaced phase transitions. Suppression of the second phase transition associated with the '00' '00' sequence is preferably not required to prevent a closely spaced transition.

FIG. 11 illustrates 1 or 2 out of 16 PHPM (Phase position modulation) according to the present invention as may be used in association with a RFID system. Each PHPM baud represents 4 bits. It is to be noted that other possible codes and/or combinations of phase changes are possible in accordance with the present invention, and in accordance with whether a 1 out of 4, 1 out of 8, 2 out of 8, 1 or 2 out of 8, 1 out of 16, 2 out of 16, 1 or 2 out of 16, 1 out of 32, etc coding is being used (but with a phase change or an amplitude change as contemplated by the present invention).

Figure 12:
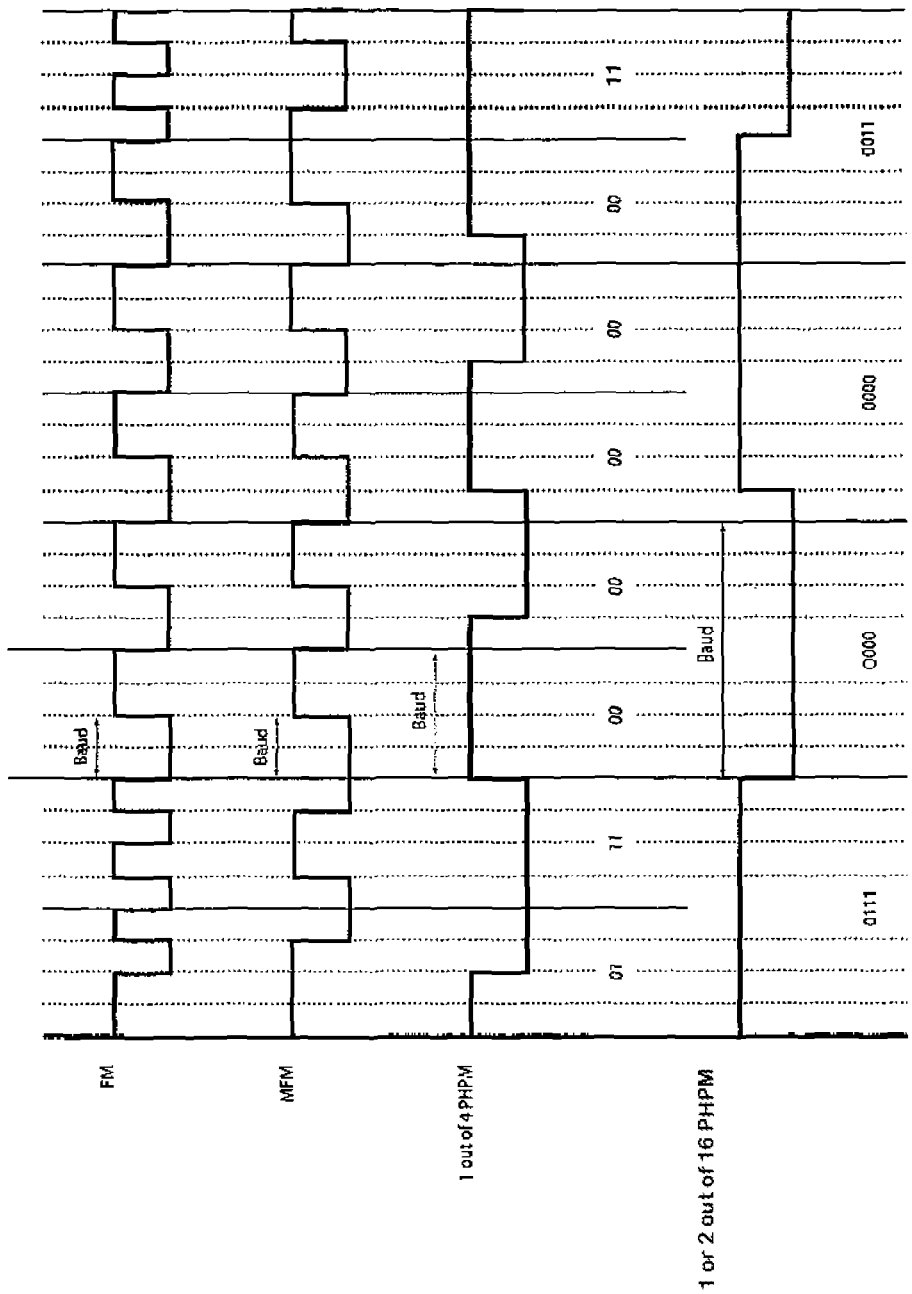
FIG. 12 illustrates and example of 1 or 2 out of 16 PHPM (Phase position modulation)

FIG. 12 illustrates an example of 1 or 2 out of 16 PHPM (Phase position modulation). FM, MFM and 1 out of 4 PHPM are also included for comparison purposes. Both 1 out of 4 PHPM and 1 or 2 out of 16 PHPM have significantly fewer phase transitions and a wider separation between phase transitions than FM or MFM. 1 or 2 out of 16 PHPM has the smallest number of phase transitions and widest separation leading to a reduced spectral occupancy with less energy at higher frequencies.

Further improvements to the PHPM modulation disclosed above are contemplated as a result of the realization that close 'transitions' can give high frequency components to a signal, that could exceed mask limits. This is a problem associated with normal 1 out of 4 coding in which the transmission of a '11' followed by '00', will normally produce two pulses relatively close together.

It can be seen from FIGS. 9 and 11 that the signal codes in accordance with embodiments of the present invention, have been chosen with relatively good spacing between transitions in order to achieve a relatively good data rate whilst having relatively fewer high frequency components in the signal spectrum. For example, a spacing of more than one time period as illustrated in FIGS. 9 and 11 is preferred.

A further alternative to the 1 out of 4 PPHM coding may be preferably employed when transmitting a sequence of two or more '00', such as '00 00'. In this alternative, it is preferred to suppress the first '00' of the sequence. This avoids the problem associated with normal 1 out of 4 coding in which the transmission of a '11' followed by a '00' will normally produce two edges relatively closely spaced together. This comes about due to the realization that where the first '00' transition is suppressed, the signal has more power at lower frequencies and less power at higher frequencies giving it a flatter spectrum with not so much of a peak.

Figure 1:
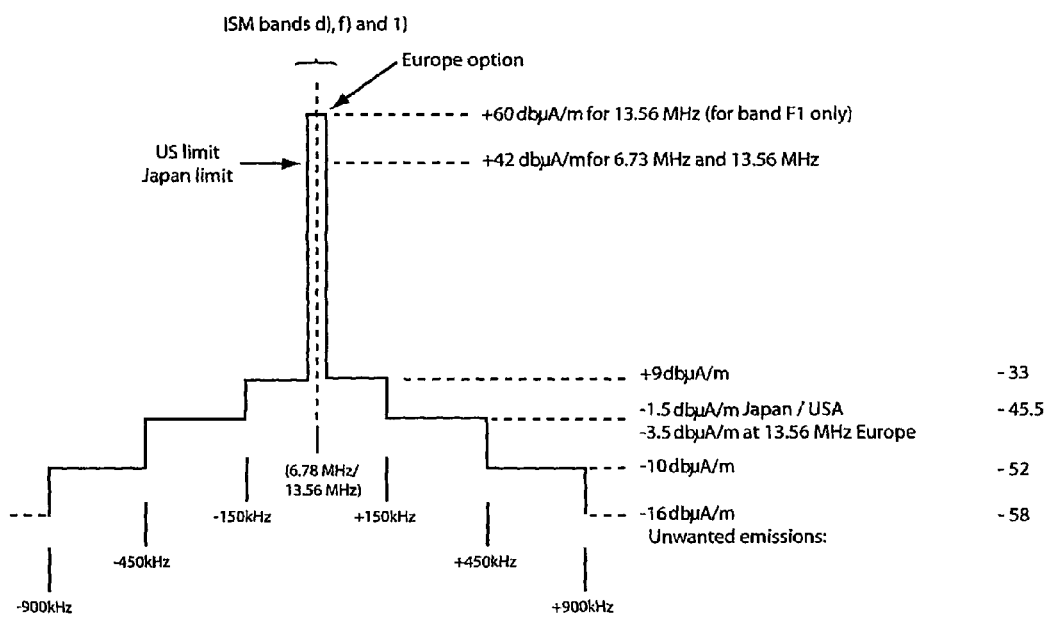
FIG. 1 illustrates a 'spectral mask' being the spectrum field strength limits as defined by CEPT/cal recommendation 70-03[3]; Draft ETSI EN300 330-1 V1.4.1 (2004-11)
Figure 3:
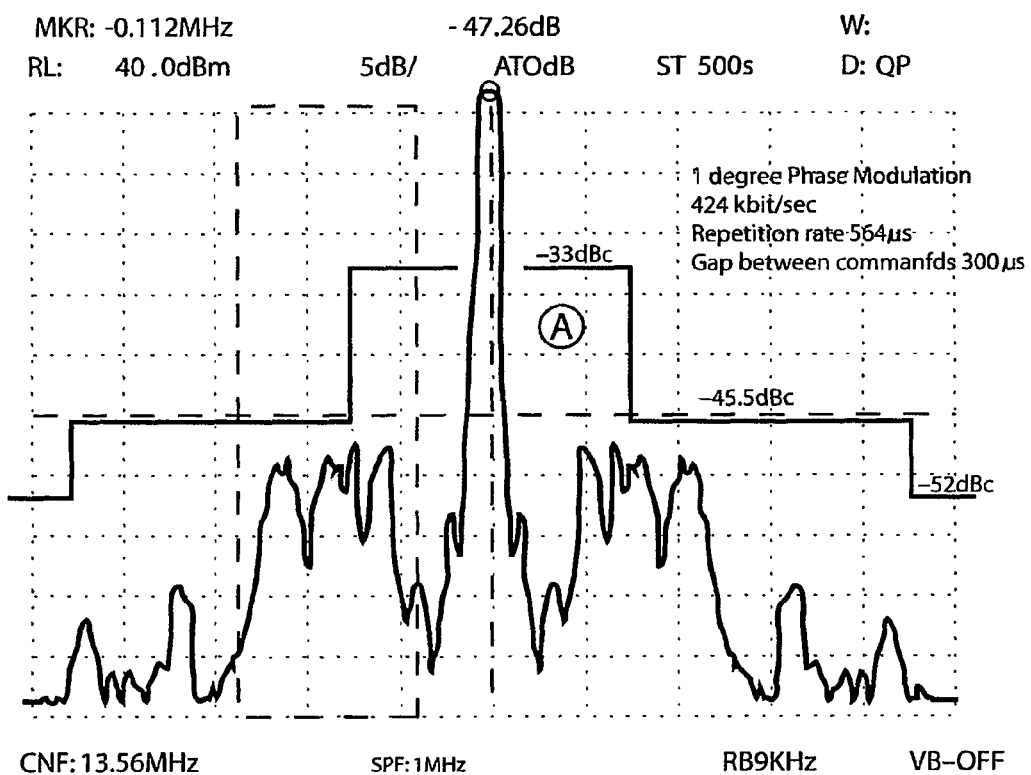
FIG. 3 illustrates a method of transmission as used by the current applicant in conjunction with their Phase Jitter Modulation (PJM) transmission technique as disclosed in WO1999034526.
Figure 4:
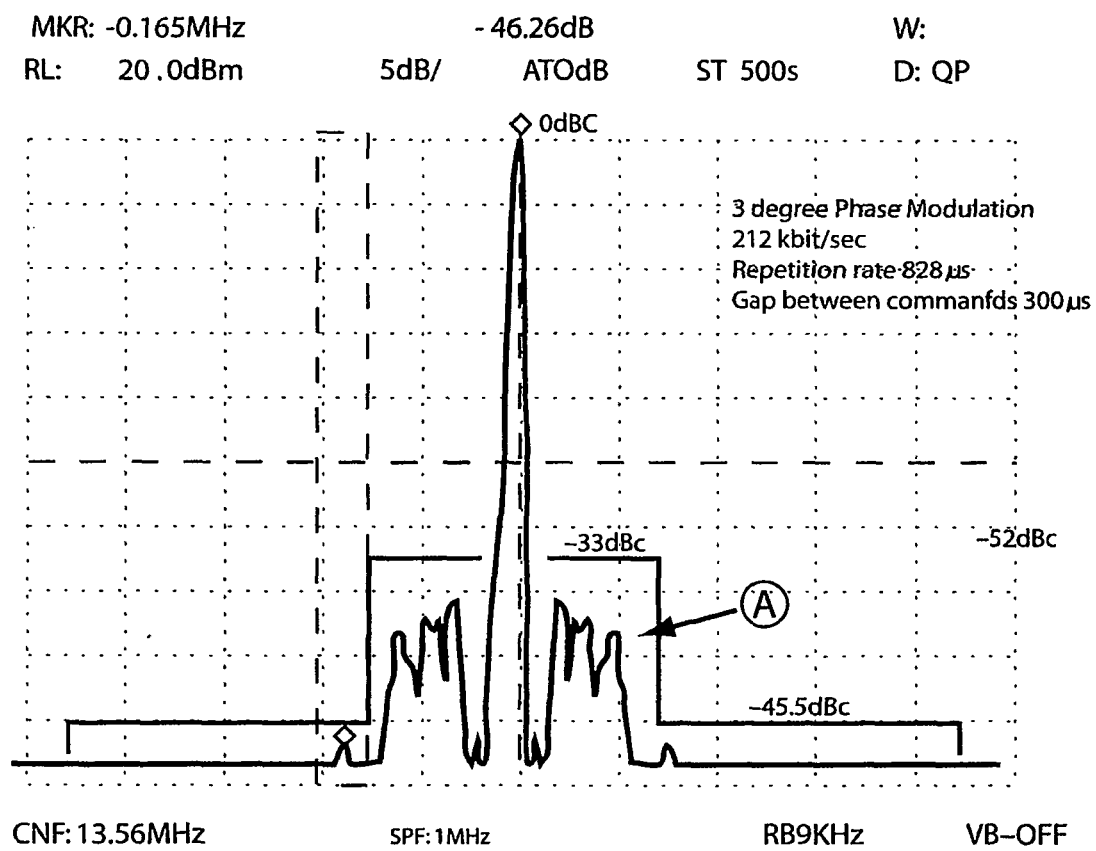
FIG. 4 illustrates an alternative method of transmission to the PJM transmission of FIG. 3.
Figure 5:
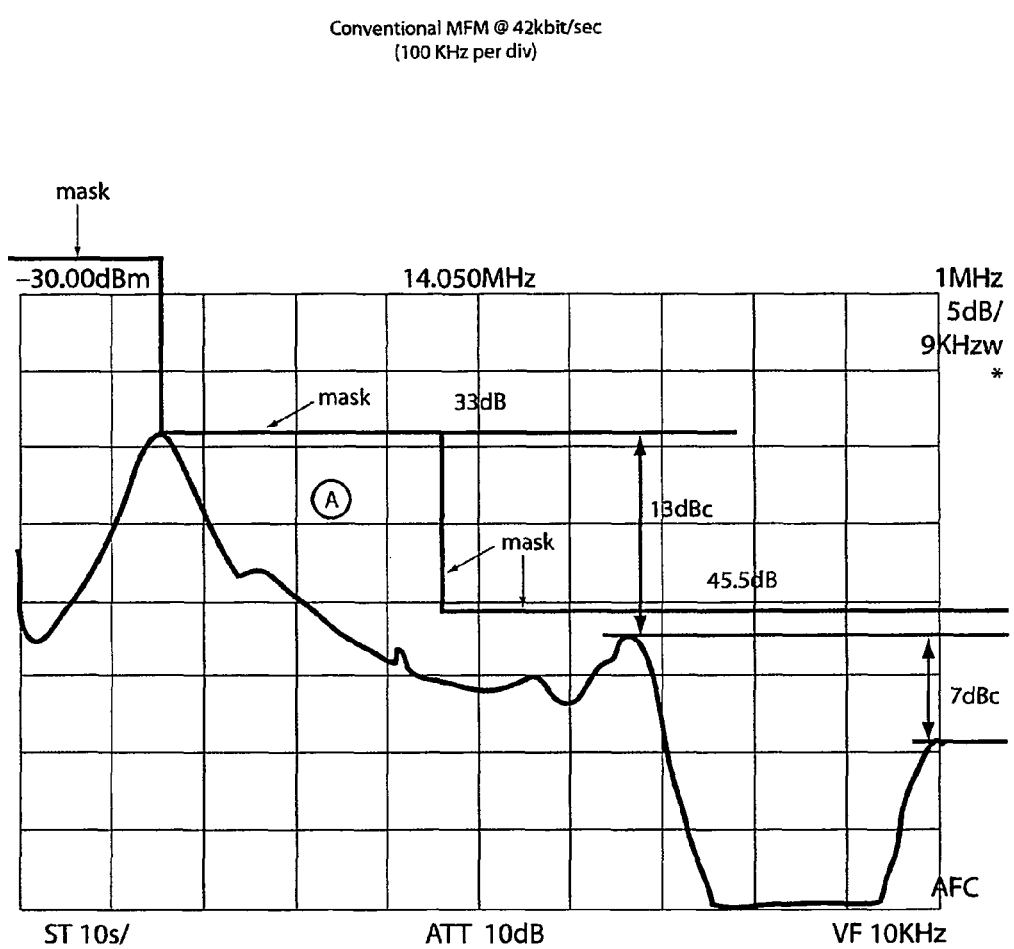
FIG. 5 illustrates a conventional MFM method of transmission, and as applied against the spectral limits of FIG. 1.
Figure 6:
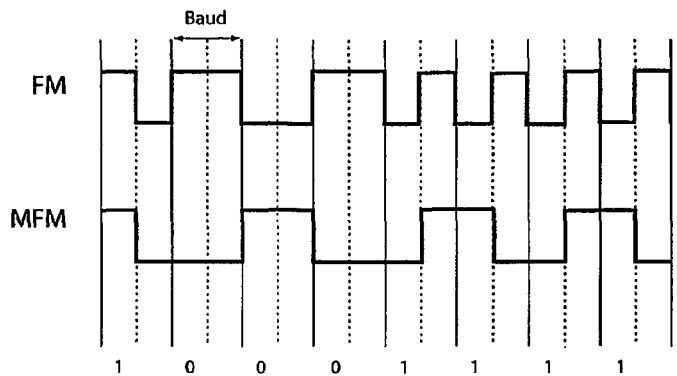
FIG. 6 illustrates an FM and an MFM method of transmission.
Figure 13:
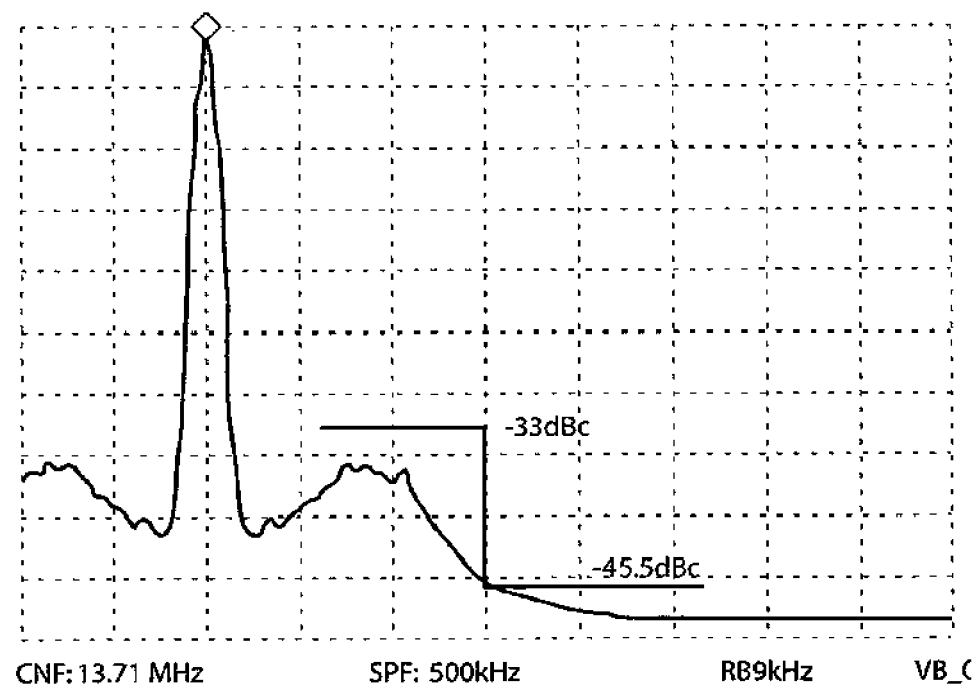
FIG. 13 illustrates a spectral representation of an embodiment of the present invention.

FIG. 13 illustrates a spectral representation of a signal in accordance with PHPM of the present invention, as applied to a Phase Jitter Modulation (PJM) transmission technique as disclosed in WO1999034526, with 3.0 degrees phase modulation and a date rate of 424 kbit/sec where the first '00' transition is suppressed. For this type of encoding up to 3.0 degrees of phase modulation is possible whilst still meeting the mask limits. This is significant when compared against the spectrum shown in FIG. 3 where a 424 kbit/sec MFM encoded signal could only meet the mask limits at 1 degree of phase modulation.

A further alternative to the 1 out of 4 PPHM coding may be preferably employed where a combination of 1 or 2 out of 16 PHPM encoding is used. The encoding rules for this are shown in FIG. 11. In this alternative, it is preferred to suppress a single '0000'. When transmitting a sequence of two or more '0000', such as '0000 0000' in this alternative, it is preferred to suppress only the first '0000' of the sequence. This avoids the problem associated with the transmission of a '1111' followed by a '0000' which will normally produce two edges relatively closely spaced together. This comes about due to the realization that where the first '0000' transition is suppressed, the signal has more power at lower frequencies and less power at higher frequencies giving it a flatter spectrum with not so much of a peak.

Figure 14:
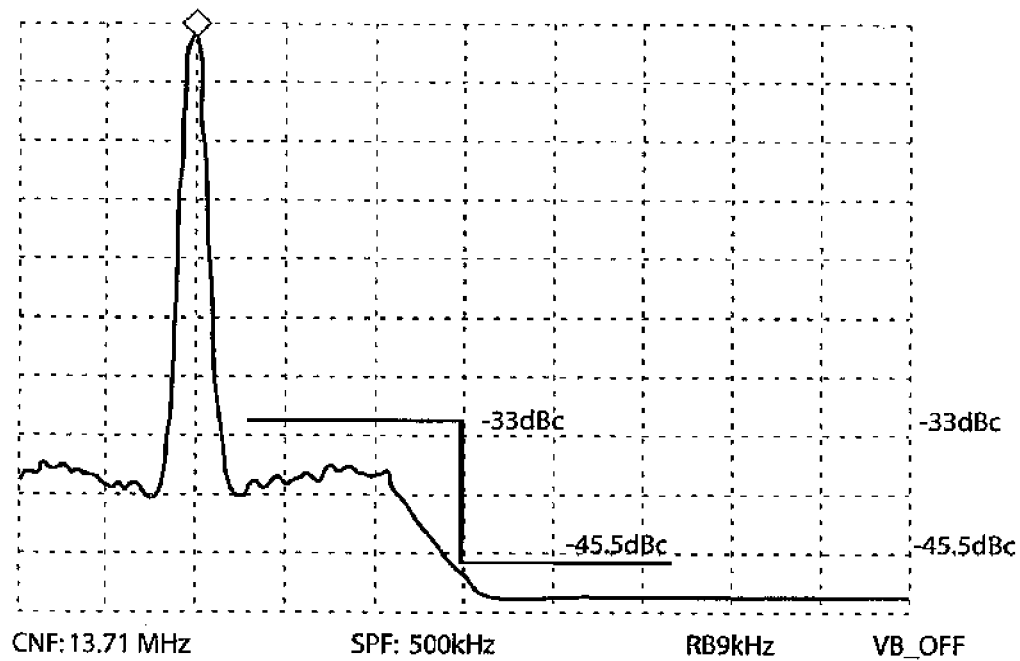
FIG. 14 illustrates another spectral representation of an embodiment of the present invention.

FIG. 14 illustrates a spectral representation of a signal in accordance with PHPM of the present invention, as applied to a Phase Jitter Modulation (PJM) transmission technique as disclosed in WO1999034526, with a 2.9 degree phase modulation and at a data rate of 424 kbit/sec where the first of '0000' transition is suppressed. For this type of encoding 3.0 degrees of phase modulation is possible whilst still meeting the mask limits.

Figure 15:
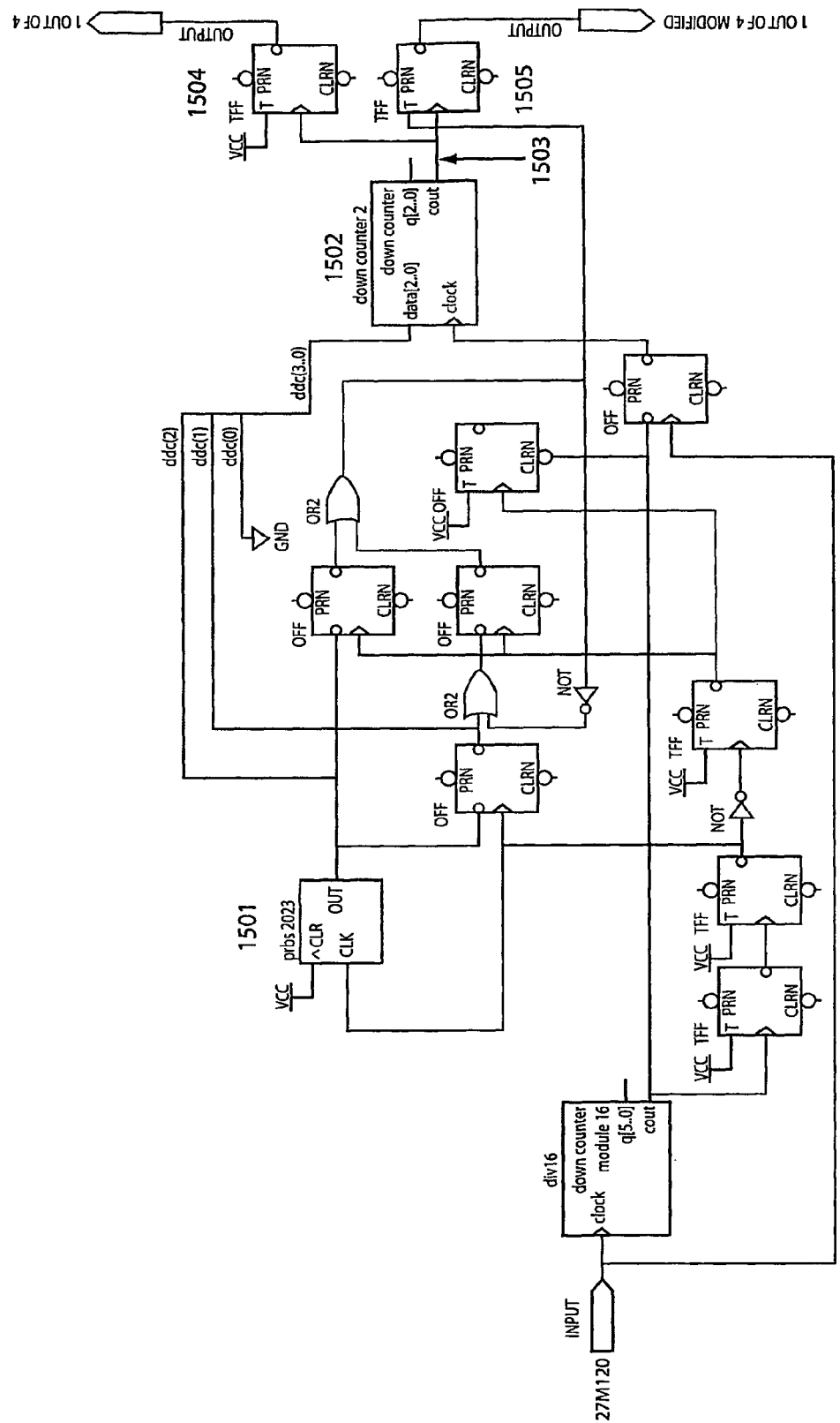
FIG. 15 illustrates a circuit that generates 1 out of 4 encoding of data.

FIG. 15 illustrates an example of a circuit that generates 1 out of 4 encoding of data. The circuit includes a PRBS data source 1501 which would normally be replaced by a command data stream. This data is loaded into a counter 1502, two bits at a time, at the beginning of each baud interval. An example of a baud interval is shown in FIG. 9. The counter then counts and, within the baud period, generates a pulse, at its carry output 1503, at a time dependent upon the loaded data. This pulse is fed to the clock input of a toggle flip-flop 1504. The output of which, marked "1 out of 4" on the circuit, produces a single edge as represented in the timing diagram in FIG. 9. The circuit also includes the means to detect each time the data sequence is XX 00, where at least one of the X bits is a 1. If such a sequence occurs the toggle input of a second flip-flop 1505 is disabled suppressing the edge for the data 00 thus generating the "1 out of 4 modified" output.

Figure 16:
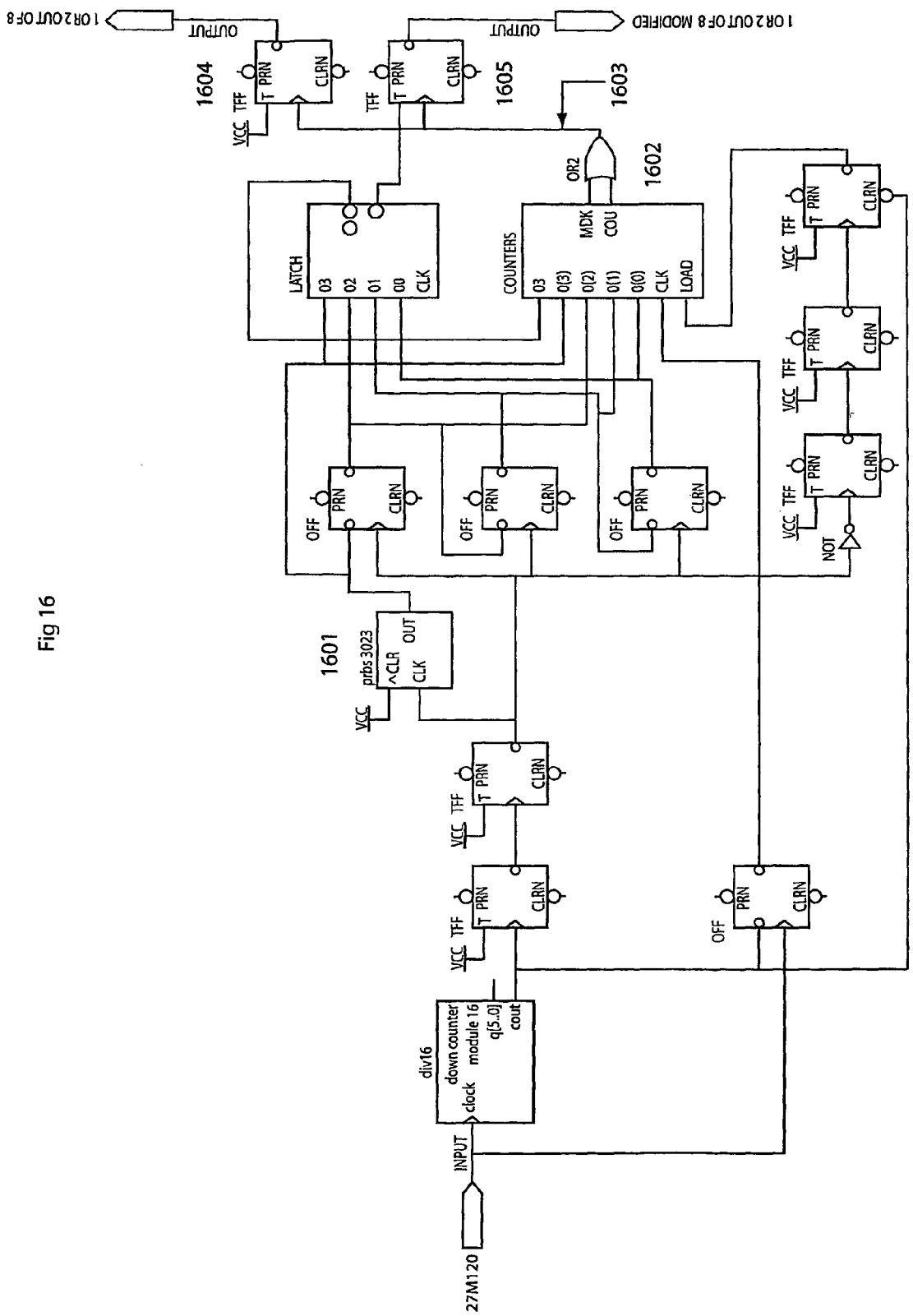
FIG. 16 illustrates a circuit that generates 1 or 2 out of 16 encoding of data.

FIG. 16 illustrates an example of a circuit that generates 1 or 2 out of 16 encoding of data. This circuit is similar to the 1 out of 4 circuit of FIG. 15 except:
data is loaded into the counter 1602 four bits at a time
there may be up to two pulses at the counters output 1603 and two edges at the flip-flop 1604 output marked "1 or 2 out of 16" per baud period as per FIG. 11
the circuit detects the data sequence XXXX 0000 where at least one of the X bits is a 1 and if such a sequence occurs the edge for the 0000 suppressed at flip-flop 1605, the "1 or 2 out of 16 modified" output.

Decoding and transmission circuits based on the present invention may be derived by those skilled in the art in line with the encoding circuits of FIGS. 15 & 16, and their understanding of decoding and transmission circuits.

In a further aspect of invention, advantageously, a change of amplitude (relative to a time/position) to indicate a particular coding may be utilised. This may be referred to as AMPM (AMplitude Position modulation). In this way, the invention may be applied to a form of amplitude modulation. For example, at 800 MHz to 900 MHz, there is UHF RFID and there is spectral occupancy around this frequency range also. UHF RFID systems typically use amplitude pulses and thus amplitude modulation is preferred for UHF systems. This aspect of invention would be applicable to UHF but applied as low level amplitude modulation where small amplitude changes represent the coding. These changes would essentially mimic the phase changes of PJM and/or PHPM. Rather than a PPM amplitude pulse, an amplitude increase or reduction of a few percent would be considered possible to carry the coding in a similar manner to the phase increase or reduction of a few degrees used with PHPM as disclosed herein. AMPM would also be applicable to HF (13.56 MHz and 6.78 MHz) as well as any other frequency or frequency ranges. Embodiments of AMPM may be expressed in a similar manner as PHPM disclosed herein. For example, FIGS. 9 to 12 which disclose a phase transition representative of a code, AMPM maybe expressed as a amplitude transition (rather than phase) representative of a code.

It will be understood by those skilled in the art of communications that the present invention has application to a wide variety of signal transmission frequencies, not Just RFID. For example:
Near Field Communication Devices
Sensor based RFID
Remotely powered devices,
RFID or passive powered devices (in general) where data as well as power is to be transmitted to the remote device (tag etc)
Any devices or applications where reduced spectral occupancy is desirable,
Any devices or applications where reduced high frequency spectral content is desirable,
Any devices or applications where improved Signal to Noise is desirable,
Any devices or applications where lower current is desirable for receiver circuits
Any devices or applications where improved signal reliability is desirable To this end, the present invention has application to many different frequencies, and/or frequency ranges, particularly, but not exclusively to frequencies associated with spectral masks. For example, the present invention is applicable to 6.78 MHz, 13.56 MHz and other ISM frequencies, UHF 800 MHz to 900 MHz for RFID and other frequencies where there are spectral masks.

Although 1 or 2 out of 16 PHPM (Phase position modulation). FM, MFM and 1 out of 4 PHPM are disclosed herein, it is to be understood that many different forms of communication are contemplated in accordance with the present invention, such as, without limitation 1 or 2 or 3 out of 16, 1 or 2 or 3 or 4 out of 32, etc.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof." Thus, unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

The invention claimed is:

1. A method of modulating a signal, the method comprising:
    determining a predefined time period during which a portion of the signal is able to be encoded, the predefined time period comprising a plurality of time intervals;
    encoding the signal in association with at least one time interval of the plurality of time intervals, the encoding providing modulation symbols associated with the predefined time period; and
    suppressing, in a data sequence of the encoded signal, a transition of any modulation symbol having only one transition and representing at least one of an amplitude change and a phase change in a first time interval of the predefined time period except where there are two or more sequential modulation symbols in the data sequence of the encoded signal that have only one transition and represent at least one of an amplitude change and a phase change in the first time interval in which case only the transition of the first one of the two or more sequential modulation symbols is suppressed.

2. The method as claimed in claim 1, wherein in response to the data sequence including a first modulation symbol '00' or two or more sequential identical first modulation symbols '00', the first '00' of the data sequence is suppressed.

3. The method as claimed in claim 1, wherein in response to the data sequence including a first modulation symbol '0000' or two or more sequential identical first modulation symbols '0000', the first '0000' of the data sequence is suppressed.

4. The method as claimed in claim 1, wherein power in the encoded signal is less than 1% of a total transmitted signal power.

5. The method as claimed in claim 4, wherein the encoded signal is transmitted as a Phase Jitter Modulation (PJM) signal.

6. The method as claimed in claim 4, wherein the encoded signal is transmitted as an amplitude modulation signal.

7. The method as claimed in claim 1, wherein the modulation symbol is suppressed by suppressing all amplitude and phase changes associated with the modulation symbol.

8. A method of encoding at least one of data and a signal, the method comprising:
    determining a predefined time period during which a portion of the at least one of data and a signal is able to be encoded, the predefined time period comprising a plurality of time intervals;
    encoding the at least one of data and a signal in accordance with a change of at least one of an amplitude change and a phase change relative to at least one of a time interval and a position of the at least one of data and a signal, the encoding providing at least one modulation symbol associated with the time interval; and
    suppressing, in a data sequence of the encoded signal, a transition of any modulation symbol having only one transition that represents at least one of an amplitude Change and a phase change in a first time interval of the predefined time period except where there are two or more sequential modulation symbols in the data sequence of the encoded signal that have only one transition representing at least one of an amplitude change and a phase change in the first time interval in which case only the transition of the first one of the two or more sequential modulation symbols is suppressed.

9. The method as claimed in claim 8, wherein power in the encoded at least one of data and a signal is less than 1% of a total transmitted signal power.

10. A method of converting at least one of data and a signal, the method comprising:
    determining a predefined time period during which a portion of the at least one of data and a signal is able to be converted, the time period comprising a plurality of time intervals;
    converting the at least one of data and a signal in accordance with a change of at least one of an amplitude change and a phase change relative to at least one of a time interval and a position of the signal, the encoding converting providing at least one modulation symbol associated with the time interval; and
    suppressing, in a data sequence of the encoded signal, a transition of any modulation symbol having only one transition that represents at least one of an amplitude change and a phase change in a first time interval of the predefined time period except where there are two or more sequential modulation symbols in the data sequence of the encoded signal that have only one transition representing at least one of an amplitude change and a phase change in the first time interval in which case only the transition of the first one of the two or more sequential modulation symbols is suppressed.

11. The method as claimed in claim 10, wherein power in the converted at least one of data and a signal is less than 1% of a total transmitted signal power.

12. A method of demodulating a signal, the method comprising:
- receiving the signal;
- determining a predefined time period during which a portion of the signal is able to be transmitted, the predefined time period comprising a plurality of time intervals; and
- decoding the signal in association with at least one time interval of the plurality of time intervals, the decoding comprising:
  - detecting at least one of an amplitude change and a phase change relative to at least one of a time interval and a position of the signal; and
  - detecting, from a data sequence of the decoded signal, suppression of a Transition of a modulation symbol representing at least one of an amplitude change and a phase change in a first time interval of the plurality of time intervals.

13. The method as claimed in claim 12, wherein the received signal is an encoded signal.

14. A method of decoding at least one of data and a signal, the method comprising:
- decoding the at least one of data and a signal in accordance with a change of at least one of an amplitude change and a phase change relative to at least one of a time interval and a position of the signal; and
- detecting, from a data sequence of the decoded at least one of data and a signal, suppression of a transition of a modulation symbol representing at least one of an amplitude change and a phase change in a first time interval of a plurality of time intervals.

15. The method as claimed in claim 14, wherein the at least one of the data and the signal is encoded.

16. An apparatus adapted to modulate a signal, the apparatus comprising:
- an encoding circuit adapted to encode the signal in association with at least one time interval, the at least one time interval being determined by a predefined time period during which a portion of the signal is able to be encoded, the predefined time period comprising a plurality of time intervals;
- wherein the encoding provides at least one modulation symbol associated with the predefined time period and having only one transition that represents at least one of an amplitude change and a phase change relative to at least one of a time interval and a position of the signal, and
- wherein, in a data sequence of the encoded signal, a transition of any modulation symbol having only one transition that represents at least one of an amplitude change and a phase change in a first time interval of the predefined time period is suppressed except where there are two or more sequential modulation symbols in the data sequence of the encoded signal that have only one transition that represents at least one of an amplitude change and a phase change in the first time interval in which case only the transition of the first one of the two or more sequential modulation symbols is suppressed.

17. A system adapted to transmit a signal, the system comprising an apparatus as claimed in claim 16 and a transmission circuit adapted to transmit the encoded signal.

18. An apparatus adapted to encode at least one of data and a signal, the apparatus comprising:
- an encoding circuit adapted to encode the at least one of data and a signal in accordance with a change of at least one of an amplitude change and a phase change relative to at least one of a time interval and a position of the at least one of data and a signal, the time interval being determined by a predefined time period during which a portion of the at least one of data and a signal is able to be encoded, the predefined time period comprising a plurality of time intervals, the encoding providing at least one modulation symbol associated with the time interval; and
- wherein, in a data sequence of the encoded signal, a transition of any modulation symbol having only one transition that represents at least one of an amplitude change and a phase change in a first time interval of the predefined time period is suppressed except where there are two or more sequential modulation symbols in the data sequence of the encoded signal that have only one transition that represents at least one of an amplitude change and a phase change in the first time interval in which case only the transition of the first one of the two or more sequential modulation symbols is suppressed.

19. A system adapted to transmit a signal, the system comprising an apparatus as claimed in claim 18 and a transmission circuit adapted to transmit the encoded at least one of data and a signal.

20. An apparatus adapted to convert at least one of data and a signal from a first format to a second format, the apparatus comprising:
- an encoding circuit adapted to convert the at least one of data and a signal in accordance with at least one of a change of amplitude and phase relative to at least one of a time interval and a position of the at least one of data and a signal, the time interval being determined by a predefined time period during which a portion of the at least one of data and a signal is able to be subject to conversion, the predefined time period comprising a plurality of time intervals, the conversion providing at least one modulation symbol associated with the time interval; and
- wherein, in a data sequence of the encoded signal, a transition of any modulation symbol having only one transition that represents at least one of an amplitude change and a phase change in a first time interval of the predefined time period is suppressed except where there are two or more sequential modulation symbols in the data sequence of the encoded signal that have only one transition that represents at least one of an amplitude change and a phase change in the first time interval in which case only the transition of the first one of the two or more sequential modulation symbols is suppressed.

* * * * *